(12) United States Patent
Currie et al.

(10) Patent No.: US 11,434,165 B2
(45) Date of Patent: Sep. 6, 2022

(54) KIT, PARTICLE MIXTURE, PASTE AND METHODS

(71) Applicant: JOHNSON MATTHEY PUBLIC LIMITED COMPANY, London (GB)

(72) Inventors: Edwin Peter Kennedy Currie, Maastricht (NL); Svetlana Nikolaevna Emelianova, Maastricht (NL); Hong Ren, Berkshire (GB)

(73) Assignee: Johnson Matthey Advances Glass Technologies B.V., Maastricht (NL)

( * ) Notice: Subject to any disclaimer, the term of this patent is extended or adjusted under 35 U.S.C. 154(b) by 0 days.

(21) Appl. No.: 17/047,301

(22) PCT Filed: Apr. 1, 2019

(86) PCT No.: PCT/GB2019/050941
§ 371 (c)(1),
(2) Date: Oct. 13, 2020

(87) PCT Pub. No.: WO2019/202295
PCT Pub. Date: Oct. 24, 2019

(65) Prior Publication Data
US 2021/0147281 A1    May 20, 2021

(30) Foreign Application Priority Data
Apr. 19, 2018    (GB) .................................... 1806411

(51) Int. Cl.
*C03C 8/22*    (2006.01)
*C03C 27/06*    (2006.01)
*C03C 8/02*    (2006.01)

(52) U.S. Cl.
CPC ................ *C03C 8/02* (2013.01); *C03C 27/06* (2013.01)

(58) Field of Classification Search
CPC .................................. C03C 8/22; C03C 27/06
See application file for complete search history.

(56) References Cited

U.S. PATENT DOCUMENTS 5,439,852 A    8/1995    Hormadaly
9,216,922 B2    12/2015    Ando et al.
(Continued)

FOREIGN PATENT DOCUMENTS

CN    1122509 A    5/1996
CN    102939271 A    2/2013
(Continued)

OTHER PUBLICATIONS

Kikutani T; Masuda N, Bismuth oxide-boron oxide group glass composition used for adhesion of electronic components, contains preset amount of bismuth oxide, boron oxide and tungsten oxide, Thomson Scientific, London, GB, Week 200638, vol. 2006, Nr:38, WPI / 2017 Clarivate Analytics, Jun. 8, 2006, & JP02006143480A A (Nippon Electric Glass Co) Jun. 8, 2006; example d; table 1.

*Primary Examiner* — Karl E Group
(74) *Attorney, Agent, or Firm* — BakerHostetler

(57) ABSTRACT

A particle mixture comprising particles of a first glass frit and particles of a second glass frit; wherein the first glass frit comprises $\geq 10$ to $\leq 25$ mol. % BaO; and $\geq 0$ to $\leq 10$ mol. % $Bi_2O_3$; and wherein the second glass frit comprises: $\geq 35$ to $\leq 55$ mol. % $Bi_2O_3$; $\geq 2$ to $\leq 20$ mol. % ZnO; and $\geq 10$ to $\leq 40$ mol. % $B_2O_3$.

27 Claims, 1 Drawing Sheet

(56) References Cited

U.S. PATENT DOCUMENTS

| | | |
|---|---|---|
| 2004/0207314 A1 | 10/2004 | Aitken et al. |
| 2005/0277550 A1 | 12/2005 | Brown et al. |
| 2006/0082298 A1 | 4/2006 | Becken et al. |
| 2007/0108423 A1* | 5/2007 | Brown .................. C03C 8/22 252/500 |
| 2007/0128967 A1 | 6/2007 | Becken et al. |
| 2007/0147154 A1 | 12/2007 | Hoffman |
| 2007/0290590 A1 | 12/2007 | Hoffman |
| 2008/0300126 A1 | 12/2008 | Goedeke et al. |
| 2009/0205371 A1 | 8/2009 | Chen et al. |
| 2010/0118912 A1 | 5/2010 | Lai et al. |
| 2010/0129666 A1 | 5/2010 | Logunov et al. |
| 2013/0223922 A1 | 8/2013 | Koval et al. |
| 2013/0239622 A1 | 9/2013 | Pastel et al. |
| 2014/0087099 A1 | 3/2014 | Veerasamy et al. |
| 2014/0151742 A1 | 6/2014 | Logunov et al. |
| 2014/0196502 A1 | 7/2014 | Masuda et al. |
| 2014/0239596 A1 | 8/2014 | Dennis et al. |
| 2014/0352778 A1* | 12/2014 | Yang .................. C03C 3/072 136/256 |
| 2015/0027168 A1 | 1/2015 | Dabich et al. |
| 2015/0218042 A1 | 8/2015 | Hogan et al. |
| 2016/0229737 A1 | 8/2016 | Naito et al. |
| 2016/0258206 A1 | 9/2016 | Dennis et al. |
| 2016/0333631 A1 | 11/2016 | Dennis et al. |
| 2017/0138115 A1 | 5/2017 | Hogan et al. |
| 2017/0161099 A1 | 9/2017 | Boek et al. |
| 2019/0055155 A1* | 2/2019 | Sridharan .................. C03C 8/24 |

FOREIGN PATENT DOCUMENTS

| | | | |
|---|---|---|---|
| CN | 103547541 A | 1/2014 | |
| EP | 2357159 A1 | 8/2011 | |
| JP | 2006143490 A * | 6/2006 | ............... C03C 3/17 |
| JP | 2006143480 A | 8/2006 | |
| JP | 2008504667 A | 2/2008 | |
| JP | 2009545860 A | 12/2009 | |
| JP | 2015511205 A | 4/2015 | |
| JP | 2016213284 A | 12/2016 | |
| JP | 2016538708 A | 12/2016 | |
| JP | 2017509573 A | 4/2017 | |
| JP | 2017199661 A | 11/2017 | |
| JP | 2019530972 A | 10/2019 | |
| KR | 20130142265 A | 12/2013 | |
| KR | 20150136359 A | 12/2015 | |
| WO | 20070147154 A2 | 12/2007 | |
| WO | 2011130632 A1 | 10/2011 | |
| WO | 2013067081 A1 | 5/2013 | |
| WO | 2016032885 | 3/2016 | |
| WO | 2016178386 A1 | 11/2016 | |
| WO | 20170161099 A1 | 9/2017 | |

\* cited by examiner

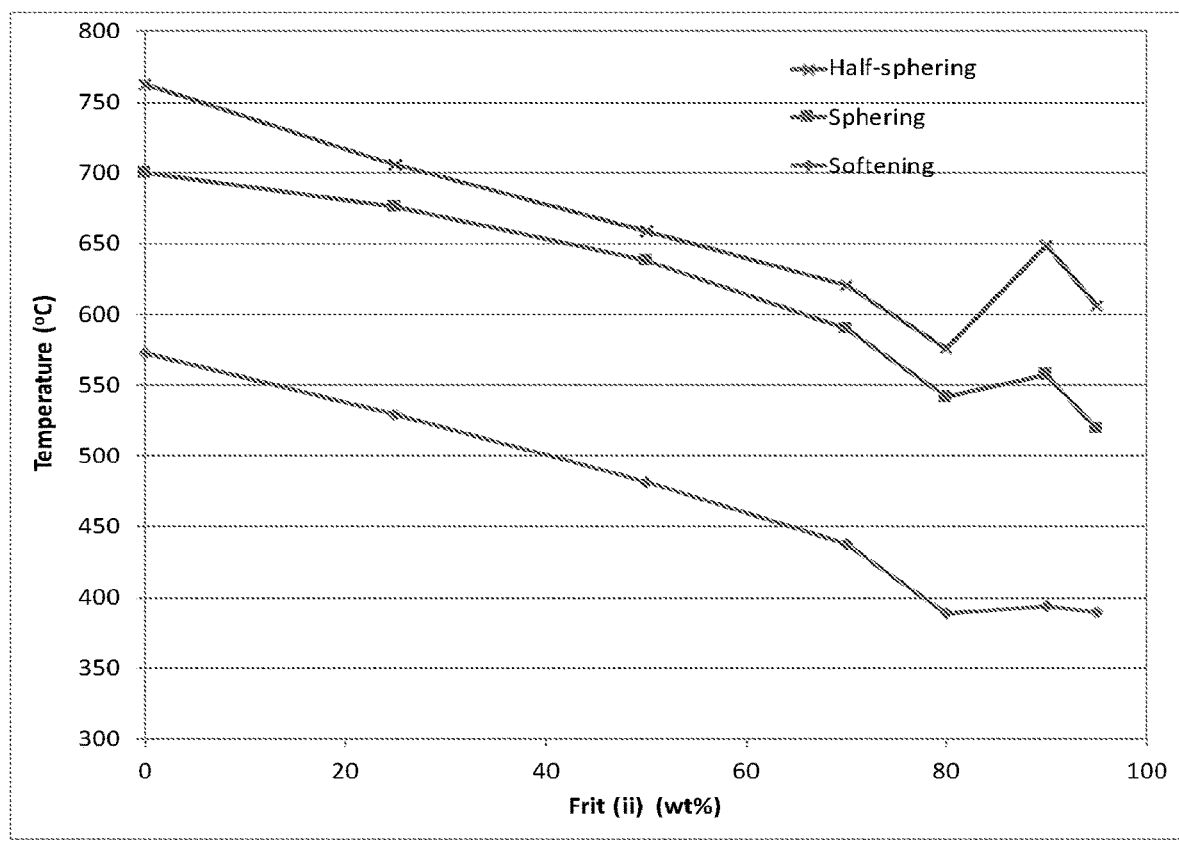

KIT, PARTICLE MIXTURE, PASTE AND METHODS

FIELD OF THE INVENTION

The present invention relates to a kit, a particle mixture and a paste suitable for forming a seal and/or bond between substrates, for example, glass or ceramic substrates. The present invention further relates to methods, articles and uses.

BACKGROUND OF THE INVENTION

Glass frit is commonly employed in the formation of seals or bonds between inorganic substrates, such as glass substrates. In particular, glass frit may be used in the formation of hermetic seals in articles which require encapsulation of sensitive components in an inert atmosphere (such as organic light emitting diode (OLED) displays, plasma display panels, semiconductor chips, sensors, solar cells, optical components or the like), or in articles which comprise an evacuated void (such as vacuum insulated glass (VIG) window units).

Typically, glass frit is applied to a substrate in the form of a paste, for example, by screen-printing. The paste may comprise particles of glass frit dispersed in a liquid dispersion medium. After application to a substrate the paste may undergo a drying step followed by a firing step. Prior to firing, the substrates to be sealed/bonded may be assembled in the required configuration with the glass frit sandwiched there-between. During firing, the frit undergoes heat treatment causing the frit to soften, flow and adhere to the substrates, thereby forming the bond or seal.

Conventional firing techniques have employed oven-heating in which the entire assembly (i.e. the substrates to be sealed/bonded, frit and any components to be encapsulated within) is subjected to the heat treatment. However, in applications where the use of tempered glass substrates and/or coated glass substrates is desirable (for example, VIG window units), exposure to high temperature environments may reduce the temper strength of substrates and/or degrade coatings applied thereto. Further, the maximum temperature that may be employed during firing is dictated by the most heat sensitive component of the entire assembly. Thus, it may be desirable that frits to be employed in sealing/bonding applications have a low softening point.

Suitable glass frit compositions having a low softening point have conventionally comprised lead oxide as a major component. However, due to environmental concerns, the use of lead is now undesirable.

Vanadium oxide containing glass compositions have been employed as an alternative to lead-based glass compositions. However, due to toxicity concerns, the use of vanadium oxide is also undesirable.

Certain bismuth oxide containing compositions have been proposed as low softening point alternatives to lead-containing or vanadium-containing glass compositions. However, it has been found that undesirable crystallisation may occur during firing of such frits and that such frits may have a relatively narrow sealing temperature operating window. The "sealing temperature operating window" of a sealing composition may be considered to be the difference between the softening temperature and the temperature at which the onset of crystallisation occurs (crystallisation point). Crystallisation during firing may lead to reduced strength of the resulting bond or seal.

Localized laser heating has also been employed as a firing technique in sealing applications, whereby the glass frit, or an area proximate where the glass frit is deposited, is selectively heated by laser irradiation to effect the sealing or bonding of substrates without significantly heating the substrates or any encapsulated components themselves.

Glass frit compositions for use in laser sealing, must be capable of absorbing radiation at the wavelength of the laser employed. Ideally, the wavelength of the laser is such that the laser energy is easily transmitted through the substrates to be sealed. In this manner, the laser may pass through the substrates without significant absorption, leaving the substrates relatively unheated, while at the same time the laser energy is absorbed by the glass frit, thereby selectively heating the frit to effect the firing thereof and the formation of a bond or seal.

Typically, glass frit compositions are chosen to have a CTE as close as possible to that of the substrates to be sealed so as to enhance the mechanical strength, reduce interfacial stress and improve crack resistance of the resulting seal/bond. Further, the composition of glass frit should be such that the resulting seal/bond has high chemical durability.

There remains a need in the art for compositions which provide an improved balance of properties. In particular, there remains a need in the art for non-toxic compositions having reduced crystallisation tendencies and/or wider sealing temperature operating windows, which produce seals of adequate strength and chemical durability.

SUMMARY OF THE INVENTION

According to a first aspect of the present invention, there is provided a kit comprising particles of a first glass frit and particles of a second glass frit; wherein the first glass frit comprises:
≥10 to ≤25 mol. % barium oxide (BaO); and
≥0 to ≤10 mol. % bismuth oxide ($Bi_2O_3$);
and wherein the second glass frit comprises:
≥35 to ≤55 mol. % bismuth oxide ($Bi_2O_3$);
≥2 to ≤20 mol. % zinc oxide (ZnO); and
≥10 to ≤40 mol. % boron oxide ($B_2O_3$).

According to a second aspect of the present invention, there is a provided a particle mixture comprising particles of a first glass frit and particles of a second glass frit; wherein the first glass frit comprises:
≥10 to ≤25 mol. % barium oxide (BaO); and
≥0 to ≤10 mol. % bismuth oxide ($Bi_2O_3$);
and wherein the second glass frit comprises:
≥35 to ≤55 mol. % bismuth oxide ($Bi_2O_3$);
≥2 to ≤20 mol. % zinc oxide (ZnO); and
≥10 to ≤40 mol. % boron oxide ($B_2O_3$).

According to a third aspect of the present invention, there is provided a paste comprising:
a) a particle mixture comprising particles of a first glass frit and particles of a second glass frit; and
b) a dispersion medium;
wherein the first glass frit comprises:
≥10 to ≤25 mol. % barium oxide (BaO); and
≥0 to ≤10 mol. % bismuth oxide ($Bi_2O_3$);
and the second glass frit comprises:
≥35 to ≤55 mol. % bismuth oxide ($Bi_2O_3$);
≥2 to ≤20 mol. % zinc oxide (ZnO); and
≥10 to ≤40 mol. % boron oxide ($B_2O_3$).

According to a further aspect of the present invention, there is provided a method of preparing a paste comprising mixing in any order:

a) particles of a first glass frit;
b) particles of a second glass frit; and
c) a dispersion medium;
wherein the first glass frit comprises:
≥10 to ≤25 mol. % barium oxide (BaO); and
≥0 to ≤10 mol. % bismuth oxide ($Bi_2O_3$);
and the second glass frit comprises:
≥35 to ≤55 mol. % bismuth oxide ($Bi_2O_3$);
≥2 to ≤20 mol. % zinc oxide (ZnO); and
≥10 to ≤40 mol. % boron oxide ($B_2O_3$).

According to yet a further aspect of the present invention, there is provided a method of forming a bond or seal between inorganic substrates, the method comprising:
i. providing a first inorganic substrate;
ii. providing a second inorganic substrate;
iii. depositing a particle mixture onto at least a portion of at least one of the inorganic substrates, wherein the particle mixture comprises a first glass frit comprising:
≥10 to ≤25 mol. % barium oxide (BaO); and
≥0 to ≤10 mol. % bismuth oxide ($Bi_2O_3$);
and a second glass frit comprising:
≥35 to ≤55 mol. % bismuth oxide ($Bi_2O_3$):
≥2 to ≤20 mol. % zinc oxide (ZnO); and
≥10 to ≤40 mol. % boron oxide ($B_2O_3$);
iv. assembling the first and second substrates such that the deposited particle mixture lies therebetween and in contact with both substrates;
v. firing the particle mixture.

According to yet another aspect, there is provided article comprising at least two inorganic substrates being connected by a bond or a seal, wherein the bond or seal is obtained or obtainable by the method described above.

According to yet another aspect, there is provided the use of a particle mixture or a paste as described above to form a seal or bond between two substrates.

BRIEF DESCRIPTION OF THE DRAWINGS

FIG. 1 is a graph showing the softening temperature, sphering temperature and half-sphering temperature, as determined by hot stage microscopy, of particle mixtures according to the present invention and of comparative examples.

DETAILED DESCRIPTION

Preferred and/or optional features of the invention will now be set out. Any aspect of the invention may be combined with any other aspect of the invention unless the context demands otherwise. Any of the preferred and/or optional features of any aspect may be combined, either singly or in combination, with any aspect of the invention unless the context demands otherwise.

Where ranges are specified herein it is intended that each endpoint of the range is independent. Accordingly, it is expressly contemplated that each recited upper endpoint of a range is independently combinable with each recited lower endpoint, and vice versa.

The glass frit compositions described herein are given as mole percentages. These mole percentages are the mole percentages of the components used as starting materials in preparation of the glass frit compositions, on an oxide basis. As the skilled person will understand, starting materials other than oxides of a specific element may be used in preparing the glass fits of the present invention. Where a non-oxide starting material is used to supply an oxide of a particular element to the glass frit composition, an appropriate amount of starting material is used to supply an equivalent molar quantity of the element had the oxide of that element been supplied at the recited mol. %. This approach to defining glass frit compositions is typical in the art. As the skilled person will readily understand, volatile species (such as oxygen) may be lost during the manufacturing process of the glass frit, and so the composition of the resulting glass frit may not correspond exactly to the mole percentages of starting materials, which are given herein on an oxide basis. Analysis of a fired glass frit by a process known to those skilled in the art, such as Inductively Coupled Plasma Emission Spectroscopy (ICP-ES), can be used to calculate the starting components of the glass frit composition in question.

The first glass frit employed in the particle mixture or kit of the present invention comprises ≥10 to ≤25 mol. % barium oxide (BaO). In some embodiments, the first glass frit may comprise at least 12 mol. % or at least 15 mol. % BaO. In some embodiments, the first glass frit may include 23 mol. % or less, 20 mol. % or less, or 18 mol. % or less of BaO. For example, the first glass frit may comprise ≥12 to ≤20 mol. %, preferably ≥15 to ≤18 mol. % of BaO.

The first glass frit comprises ≥0 to ≤10 mol. % $Bi_2O_3$. In some embodiments, the first glass frit comprises 8 mol. % or less, 5 mol. % or less, or 2 mol. % or less $Bi_2O_3$. For example, the first glass frit may comprise ≥0 to ≤5 mol. % $Bi_2O_3$, preferably ≥0 to ≤2 mol. % $Bi_2O_3$.

The first glass frit may further comprise $B_2O_3$. In some embodiments, the first glass frit may comprise at least 10 mol. %, at least 12 mol. %, at least 15 mol. %, at least 20 mol. %, at least 25 mol. %, or at least 30 mol. % $B_2O_3$. In some embodiments, the first glass frit may comprise 50 mol. % or less, 40 mol. % or less, 35 mol. % or less, or 30 mol. % or less of $B_2O_3$. For example, the first glass frit may comprise ≥15 to ≤35 mol. % or ≥20 to ≤30 mol. % of $B_2O_3$.

The first glass frit may further comprise ZnO. In some embodiments, the first glass frit may comprise at least 10 mol. %, at least 12 mol. %, at least 15 mol. %, at least 20 mol. %, or at least 30 mol. % ZnO. In some embodiments, the first glass frit may comprise 50 mol. % or less, 40 mol. % or less, 35 mol. % or less, or 30 mol. % or less of ZnO. For example, the first glass frit may comprise ≥10 to ≤40 mol. %, ≥15 to ≤35 mol. %, or ≥20 to ≤30 mol. % of ZnO.

The first glass frit may further comprise $SiO_2$. In some embodiments, the first glass frit may comprise at least 10 mol. %, at least 12 mol. %, or at least 15 mol. % $SiO_2$. In some embodiments, the first glass frit may comprise 50 mol. % or less, 40 mol. % or less, or 30 mol. % or less of $SiO_2$. For example, the glass frit may comprise ≥12 to ≤40 mol. %, preferably ≥15 to ≤30 mol. % of $SiO_2$.

The first glass frit may further comprise $Al_2O_3$. In some embodiments, the first glass frit may comprise at least 0.5 mol. %, at least 1 mol. %, or at least 2 mol. % $Al_2O_3$. In some embodiments, the glass frit may comprise 20 mol. % or less, 15 mol. % or less, 10 mol. % or less, or 5 mol. % or less, or 4 mol. % or less of $Al_2O_3$. For example, the first glass frit may comprise ≥0.5 to ≤10 mol. %, preferably ≥0.5 to ≤4 mol. % of $Al_2O_3$.

The first glass frit may further comprise one or more transition metal oxides. For example, the first glass frit may comprise one or more selected from manganese oxide (MnO), iron oxide ($Fe_2O_3$), copper oxides (CuO), zirconium oxide (ZrO), cobalt oxide (CoO), tungsten oxide ($WO_3$), molybdenum oxide ($MoO_3$), niobium oxide ($Nb_2O_5$), chromium oxide ($Cr_2O_3$), tantalum oxide ($Ta_2O_5$) and titanium oxide ($TiO_2$). Advantageously, the presence of transition metal oxides may result in the first glass frit being dark in colour. Darker coloured frits are more susceptible to absorption of radiation. Thus, where the first glass frit comprises transition metal oxides, the particle mixture of the present invention may undergo firing via selective heating techniques such as laser irradiation.

In some embodiments, the first glass frit may comprise at least 1 mol. % in total of transition metal oxides. In some embodiments, the first glass frit may comprise 20 mol. % or less in total of transition metals oxides. For example, the first glass frit may comprise ≥1 to ≤20 mol. % in total of transition metal oxides.

The first glass frit may comprise MnO. In some embodiments, the first glass frit may comprise at least 0.5 mol. %, at least 1 mol. %, or at least 2 mol. % MnO. In some embodiments, the first glass frit may comprise 20 mol. % or less, 15 mol. % or less, or 10 mol. % or less of MnO. For example, the first glass frit may comprise ≥1 to ≤15 mol. % or ≥2 to ≤10 mol. % of MnO.

The first glass frit may comprise $Fe_2O_3$. In some embodiments, the first glass frit may comprise at least 0.1 mol. %, at least 0.5 mol. %, or at least 1 mol. % $Fe_2O_3$. In some embodiments, the first glass frit may comprise 15 mol. % or less, 10 mol. % or less, or 5 mol. % or less of $Fe_2O_3$. For example, the first glass frit may comprise ≥0.5 to ≤10 mol. % or ≥1 to ≤5 mol. % of $Fe_2O_3$.

The first glass frit may further include alkali metal oxide, for example one or more selected from $Li_2O$, $Na_2O$, $K_2O$, and $Rb_2O$, preferably one or more selected from $Li_2O$, $Na_2O$ and $K_2O$. In some embodiments, the first glass frit may comprise at least 0.1 mol. %, at least 0.5 mol. %, or at least 1 mol. % alkali metal oxide. In some embodiments, the first glass frit may comprise 15 mol. % or less, 10 mol. % or less, or 5 mol. % or less alkali metal oxide. For example, the first glass frit may comprise ≥0.5 to ≤10 mol. % or ≥1 to ≤5 mol. % of alkali metal oxide.

The first glass frit may be substantially free of certain components. As used herein, the term "substantially free of" in relation to a glass frit composition means that the glass frit has a total content of the recited component of less than or equal to 1 mol. %. As will be readily understood by the skilled person, during manufacture of glass frit particles, the glass composition may be contaminated with low levels of impurities. For example, in a melt/quench glass forming process, such impurities may derive from refractory linings of vessels employed in the melting step. Thus, whilst a total absence of a particular component may be desirable, in practice this may be difficult to achieve. As used herein, the term "no intentionally added X", where X is a particular component, means that no raw material was employed in the manufacture of the glass frit which was intended to deliver X to the final glass composition, and the presence of any low levels of X in the glass frit composition is due to contamination during manufacture.

In some embodiments, the first glass frit is substantially free of lead oxide (PbO). For example, the first glass frit may comprise less than 0.5 mol. % PbO, less than 0.1 mol. % PbO, less than 0.05 mol. %, less than 0.01 mol. % or less than 0.005 mol. % PbO. In some embodiments, the first glass fit may comprise no intentionally added lead oxide (PbO).

In some embodiments, the first glass frit is substantially free of vanadium oxides. For example, the first glass frit may comprise less than 0.5 mol. % vanadium oxides, less than 0.1 mol. % vanadium oxides, less than 0.05 mol. %, less than 0.01 mol. % or less than 0.005 mol. % vanadium oxides. In some embodiments, the first glass frit may comprise no intentionally added vanadium oxides.

The first glass fit may include further components, such as further oxide components. The further components may comprise, for example, alkali-earth metal oxides, and/or rare earth metal oxides. Alternatively or additionally, the further components may comprise non-oxide components such as fluorine or sulphur.

In one embodiment of the present invention, the first glass frit may comprise:
a) ≥10 to ≤25 mol. % BaO;
b) ≥0 to ≤10 mol. % $Bi_2O_3$;
c) ≥15 to ≤35 mol. % ZnO; and
d) ≥15 to ≤35 mol. % $B_2O_3$.

The first glass frit may consist essentially of a composition as described herein, and incidental impurities (such as impurities picked up during manufacture of the glass frit). In that case, as the skilled person will readily understand that the total weight % of the recited constituents will be 100 mol. %, any balance being incidental impurities. Typically, any incidental impurity will be present at 1 mol % or less, preferably 0.5 mol % or less, more preferably 0.2 mol % or less.

In one embodiment, the first glass frit may consist essentially of:
a) ≥10 to ≤25 mol. % BaO;
b) ≥0 to ≤10 mol. % $Bi_2O_3$;
c) ≥15 to ≤35 mol. % ZnO;
d) ≥15 to ≤35 mol. % $B_2O_3$;
e) ≥10 to ≤40 mol. % $SiO_2$;
f) ≥0.5 to ≤4 mol. % $Al_2O_3$;
g) ≥1 to ≤15 mol. % transition metal oxide;
h) ≥0.5 to ≤15 mol. % alkali metal oxide;
i) ≥0 to ≤10 mol. % of further components, which may optionally be selected from the group consisting of alkali earth metal oxides, rare earth oxides, fluorine and sulphur; and
j) incidental impurities.

The first glass frit may have a softening point temperature ($T_f$) in the range 450 to 800° C. For example, the first glass frit may have a $T_f$ in the range in the range 500 to 700° C.

As used herein, the term "softening point", or "$T_f$" means the first temperature at which indications of softening or deformation of a glass are observed, as measured by hot stage microscopy (HSM).

The first glass frit may have a glass transition temperature ($T_g$) in the range 300 to 600° C. For example, the first glass frit may have a $T_g$ in the range 450 to 550° C.

As used herein, the term "glass transition temperature", or "$T_g$" means the glass transition temperature as measured according to the ASTM E1356 "Standard Test Method for Assignment of the Glass Transition Temperature by Differential Scanning calorimetry".

The first glass frit preferably has a coefficient of thermal expansion (CTE) in the range $40 \times 10^{-7}/°$ C. to to $90 \times 10^{-7}/°$ C., as measured using a dilatometer. A suitable dilatometer is a DIL803 Dual Sample Dilatometer available from TA Instruments.

The particles of the first glass frit may have a D90 particle size of less than 40 microns. In some embodiments, the particles of the first glass frit may have a D90 particle size of less than 35 microns, less than 30 microns, less than 25 microns, less than 20 microns, less than 15 microns, less than 10 microns, less than 5 microns or less than 2 microns.

The term "D90 particle size" herein refers to particle size distribution, and a value for D90 particle size corresponds to the particle size value below which 90%, by volume, of the total particles in a particular sample lie. The D90 particle size may be determined using a laser diffraction method (e.g. using a Malvern Mastersizer 2000).

Particles of the first glass frit may be prepared by mixing together the required raw materials and melting them to form a molten glass mixture, then quenching to form a glass (melt/quench glass forming). The process may further comprise milling the resulting glass to provide glass frit particles of the desired particle size. For example, the glass may be milled using a bead-milling process, such as wet bead-milling in an alcohol-based or a water-based solvent. The skilled person is aware of alternative suitable methods for preparing glass frit. Suitable alternative methods include water quenching, sol-gel processes and spray pyrolysis.

The second glass frit employed in the present invention comprises ≥35 to ≤55 mol. % bismuth oxide ($Bi_2O_3$). In some embodiments, the second glass frit may comprise at least 40 mol. %, or at least 45 mol. % $Bi_2O_3$. In some embodiments, the second glass frit may comprise 50 mol. % or less $Bi_2O_3$. For example, the second glass frit may comprise ≥40 to ≤50 mol. % $Bi_2O_3$.

The second glass frit further comprises ZnO in an amount of ≥2 to ≤20 mol. %. In some embodiments, the second glass frit may comprise at least 2.5 mol. %, at least 3 mol. %, at least 4 mol. %, at least 5 mol. %, or at least 6 mol. % ZnO. In some embodiments, the second glass frit may comprise 15 mol. % or less, or 10 mol. % or less of ZnO. For example, the second glass frit may comprise ≥2 to ≤15 mol. %, ZnO.

The second glass frit employed in the present invention comprises ≥10 to ≤40 mol. % boron oxide ($B_2O_3$). In some embodiments, the second glass frit may comprise at least 12 mol. %, at least 15 mol. %, at least 20 mol. %, at least 25 mol. %, or at least 30 mol. % $B_2O_3$. In some embodiments, the second glass frit may comprise 38 mol. % or less, or 35 mol. % or less of $B_2O_3$. For example, the second glass frit may comprise ≥15 to ≤38 mol. % or ≥20 to ≤35 mol. % $B_2O_3$.

The second glass frit may further comprise $SiO_2$. In some embodiments, the second glass frit may comprise at least 1 mol. %, at least 2 mol. % or at least 5 mol. % $SiO_2$. In some embodiments, the second glass frit may comprise 20 mol. % or less, 15 mol. % or less, 12 mol. % or less or 11 mol. % or less of $SiO_2$. For example, the second glass frit may comprise ≥2 to ≤15 mol. %, preferably ≥5 to ≤11 mol. % of $SiO_2$.

The second glass frit may further comprise $Al_2O_3$. In some embodiments, the second glass frit may comprise at least 1 mol. %, at least 2 mol. %, or at least 3 mol. % $Al_2O_3$. In some embodiments, the second glass frit may comprise 15 mol. % or less, 10 mol. % or less, or 8 mol. % or less of $Al_2O_3$. For example, the second glass frit may comprise ≥0 to ≤15 mol. % $Al_2O_3$.

The second glass frit may optionally comprise CuO. In some embodiments, the second glass frit may comprise at least 1 mol. %, at least 2 mol. %, or at least 3 mol. % CuO. In some embodiments, the second glass frit may include 10 mol. % or less, 8 mol. % or less, or 6 mol. % or less of CuO. For example, the second glass frit may comprise ≥0 to ≤8 mol. % or ≥2 to ≤8 mol. % of CuO.

The second glass frit may optionally comprise BaO. In some embodiments, the second glass frit may comprise at least 0.1 mol. %, at least 0.5 mol. %, or at least 1 mol. % BaO. In some embodiments, the second glass frit may include 5 mol. % or less, or 3 mol. % or less of BaO. For example, the second glass frit may comprise ≥0 to ≤3 mol. % of BaO.

The second glass frit may further include alkali metal oxide, for example one or more selected from $Li_2O$, $Na_2O$, $K_2O$, and $Rb_2O$, preferably one or more selected from $Li_2O$, $Na_2O$ and $K_2O$. In some embodiments, the second glass frit may include at least 0.1 mol. %, at least 0.5 mol. %, or at least 1 mol. % alkali metal oxide. In some embodiments, the second glass frit may include 15 mol. % or less, 10 mol. % or less, or 5 mol. % or less alkali metal oxide. For example, the second glass frit may comprise ≥0.5 to ≤10 mol. % or ≥1 to ≤5 mol. % of alkali metal oxide.

In some embodiments, the second glass frit is substantially free of lead oxide (PbO). For example, the first glass frit may comprise less than 0.5 mol. % PbO, less than 0.1 mol. % PbO, less than 0.05 mol. %, less than 0.01 mol. % or less than 0.005 mol. % PbO. In some embodiments, the second glass frit may comprise no intentionally added lead oxide (PbO).

In some embodiments, the second glass frit is substantially free of vanadium oxides. For example, the second glass frit may comprise less than 0.5 mol. % vanadium oxides, less than 0.1 mol. % vanadium oxides, less than 0.05 mol. %, less than 0.01 mol. % or less than 0.005 mol. % vanadium oxides. In some embodiments, the second glass frit may comprise no intentionally added vanadium oxides.

In a particularly preferred embodiment, both the first glass frit and the second glass frit are substantially free of PbO and substantially free of vanadium oxides.

The second glass frit may include further components, such as further oxide components. The further components may, for example, comprise alkali-earth metal oxides, transition metal oxides and/or rare earth oxides. Alternatively or additionally, the further components may comprise non-oxide components such as fluorine or sulphur.

The second glass frit may consist essentially of a composition as described herein, and incidental impurities (such as impurities picked up during manufacture of the glass frit). In that case, as the skilled person will readily understand that the total weight % of the recited constituents will be 100 mol. %, any balance being incidental impurities. Typically, any incidental impurity will be present at 1 mol % or less, preferably 0.5 mol % or less, more preferably 0.2 mol % or less.

In one embodiment, the second glass frit may consist essentially of:
a) ≥35 to ≤55 mol. % $Bi_2O_3$;
b) ≥2 to ≤20 mol. % ZnO;
c) ≥10 to ≤40 mol. % $B_2O_3$;
d) ≥5 to ≤11 mol. % $SiO_2$;
e) ≥0 to ≤15 mol. % $Al_2O_3$;
f) ≥0 to ≤7 mol. % CuO;
g) ≥0 to ≤15 mol. % alkali metal oxide;
h) ≥0 to ≤3 mol. % BaO;
i) ≥0 to ≤10 wt. % of further components, which may optionally be selected from the group consisting of alkali earth metal oxides, transition metal oxides, fluorine and sulphur; and
j) incidental impurities.

The second glass frit may have a $T_f$ temperature in the range 250 to 700° C. For example, the second glass frit may have a $T_f$ in the range 300 to 650° C.

In some embodiments, the $T_f$ of the second glass frit is lower than that of the first glass frit.

Advantageously, it has been found that the use of a lower $T_f$ frit combined with a higher $T_f$ frit may provide a sealant composition having an improved balance of properties compared to the use of a single frit. In particular, it has been found that the particle mixture of the present invention may provide a low-softening sealant composition. Surprisingly, it has been found that the crystallisation tendencies of the particle mixture of the present invention may be suppressed compared to those observed in some low-softening single frit systems.

The second glass frit may have a glass transition temperature ($T_g$) in the range 200 to 600° C. For example, the second glass frit may have a $T_g$ in the range 280 to 480° C.

The second glass frit may have a coefficient of thermal expansion (CTE) in the range $70 \times 10^{-7}$/° C. to $110 \times 10^{-7}$/° C.

In some embodiments, the CTE of the second glass frit is greater than the CTE of the first glass frit.

The particles of the second glass frit may have a D90 particle size of less than less than 40 microns. In some embodiments, the particles of the second glass frit may have a D90 particle size of less than 35 microns, less than 30 microns, less than 25 microns, less than 20 microns, less than 15 microns, less than 10 microns, less than 5 microns, or less than 2 microns.

In one embodiment, the D90 particle size of the particles of the first glass frit may be approximately the same as the D90 particle size of the particles of the second glass frit.

Particles of the second glass frit may be prepared in the same manner as described above in relation to the particles of the first glass frit.

The kit or the particle mixture according to the present invention may comprise from ≥25 to ≤75 wt. % particles of the first glass frit, preferably ≥40 to ≤60 wt. % of particles of the first glass frit, based on total weight of the kit or the particle mixture respectively. The kit or particle mixture may comprise from ≥25 to ≤75 wt. % particles of the second glass frit, preferably ≥40 to ≤60 wt. % particles of the second glass frit, based on total weight of the kit or particle mixture respectively.

The kit or the particle mixture of the present invention may further comprise particles of a filler. Fillers may be employed in order to adjust the overall CTE of the kit or particle mixture. When used in the particle mixture of the present invention, such fillers may constitute no greater than about 15 wt. %, preferably no greater than about 10 wt. % of the particle mixture.

In one embodiment, the kit of the present invention may comprise:
  a) ≥25 to ≤75 wt. % particles of the first glass frit;
  b) ≥25 to ≤75 wt. % particles of the second glass frit;
  c) ≥5 to ≤10 wt. % particles of filler.

In one embodiment, the particle mixture of the present invention may comprise:
  a) ≥25 to ≤75 wt. % particles of the first glass frit;
  b) ≥25 to ≤75 wt. % particles of the second glass frit;
  c) ≥5 to ≤10 wt. % particles of filler.

Suitable fillers may comprise cordierite, zirconia, stabilised zirconia and/or alumina.

In some embodiments, the kit or particle mixture of the present invention may comprise two or more different types of filler.

Preferably, the D90 particle size of the particles of filler is less than or equal to the D90 particle size of one or both of the particles of first glass frit and the particles of second glass frit. In some embodiments, the D90 particle size of the particles of filler is less than 25 microns, less than 15 microns, less than 10 microns, less than 5 microns, or less than 2 microns.

The particle mixture of the present invention may be prepared by mixing particles of the first glass frit and particles of the second glass frit. Where filler is employed, the particle mixture may be prepared by mixing particles of the first glass frit, particles of the second glass frit and particles of filler.

The kit according to the present invention may further comprise a dispersion medium.

The particle mixture of the present invention may be combined with a dispersion medium to form a paste.

The paste according to the present invention comprises a particle mixture as described above; and a dispersion medium. The paste of the present invention may be applied to a substrate (e.g. via printing) in order to deposit the particle mixture onto the substrate.

As used herein, the term "dispersion medium" refers to a substance which is in the liquid phase at the conditions intended for application of the paste to a substrate (i.e. printing conditions). Thus, at ambient conditions the dispersion medium may be solid or a liquid too viscous for printing. As the skilled person will readily understand, combination of the particles of the first frit and the particles of the second frit with a dispersion medium to form the paste may take place at elevated temperature if required.

The dispersion medium to be employed in the present invention may be selected on the basis of the intended method of applying the paste to a substrate. Typically, the dispersion medium comprises an organic liquid.

In one embodiment, the dispersion medium adequately suspends the particle mixture at application conditions, and is removed completely during drying of the applied paste and/or firing of the deposited particle mixture. Factors influencing the choice of medium include solvent viscosity, evaporation rate, surface tension, odour and toxicity. Suitable mediums preferably exhibit non-Newtonian behavior at printing conditions. Suitably, the medium comprises one or more of water, alcohols, glycol ethers, lactates, glycol ether acetates, aldehydes, ketones, aromatic hydrocarbons and oils. Mixtures of two or more solvents are also suitable.

The paste may further comprise one or more additives. These may include dispersants, binders, resins, viscosity/rheology modifiers wetting agents, thickeners, stabilisers and surfactants.

The paste of the present invention may comprise from about 30 to about 95 wt. % of the particle mixture described above, more preferably about 40 to about 92 wt. %, and further comprise about 5 to about 70 wt. % of the dispersion medium based on total weight of the paste.

In some embodiments, the paste is preferably substantially lead-free, that is, any lead-containing components are substantially absent from the paste. For example, the paste may comprise less than 0.1 wt. % lead.

The rheology of the paste can be adjusted depending on the technique to be used to apply the paste onto a substrate. The viscosity of the paste can be modified by the use of viscous resins such as vinyl, acrylic or polyester resins, solvents, film formers such as cellulosic materials, and the like.

The paste of the present invention may be prepared by mixing in any order:
  a) particles of the first glass frit according to any embodiment described above;
  b) particles of the second glass frit according to any embodiment described above; and
  c) a dispersion medium.

In some embodiments, the paste of the present invention may be prepared by mixing in any order:
  a) particles of the first glass frit according to any embodiment described above;
  b) particles of the second glass frit according to any embodiment described above;
  c) particles of a filler; and
  d) a dispersion medium.

The components may be mixed, for example, using a propeller mixer, a high shear mixer, or a bead-mill. In some embodiments, the dispersion medium and/or the combined components may be heated prior to and/or during mixing.

In some cases, it may be desirable to mill glass frit particles to the desired particle size after they have been combined with the dispersion medium. Suitable milling techniques include bead milling, ball milling, basket milling or other appropriate wet milling techniques.

The particle mixture or the paste of the present invention may be employed in a method of forming a seal or bond between two inorganic substrates. For example, the particle mixture or the paste of the present invention may be employed in a method of forming a hermetic seal between two glass substrates. Such a method may comprise:
  i. providing a first inorganic substrate;
  ii. providing a second inorganic substrate;
  iii. depositing the particle mixture described above onto at least a portion of at least one of the inorganic substrates;
  iv. assembling the first and second substrates such that deposited particle mixture lies therebetween and in contact with both substrates;
  v. firing the particle mixture.

In step iii. of the method of forming a seal or bond, the particle mixture may deposited onto both substrates.

Deposition of the particle mixture onto at least a portion of a substrate, may be achieved by applying a coating of the paste described above onto the portion of the at least one substrate. The coating of paste may be applied to a substrate via a suitable printing method. For example, the coating of paste may be applied to a substrate via inkjet printing, screen printing, roller coating or by dispenser application. In a preferred embodiment, the paste is applied to the substrate via screen printing.

The applied coating of paste may have a wet layer thickness in the range 20 to 500 microns. The wet layer thickness of the applied coating may vary depending on the intended end use of the sealed/bonded substrates.

After application of the paste coating to a substrate and prior to firing, the applied coating may undergo a drying step for removal or partial removal of solvents present in the dispersion medium. Drying may be carried out at temperatures of up to 350° C. Drying may be carried out, for example, by air drying the applied coating at ambient temperature, by heating the paste-coated substrate in a suitable oven, or by exposing the paste-coated substrate to infrared radiation.

Subsequent to any drying step and prior to firing of the deposited particle mixture, the applied coating may undergo a pre-firing step. As used herein "pre-firing" refers to heating the coated substrate to a temperature in the range ≥200° C. to 400° C., for removal of non-volatile components deriving from the dispersion medium, for example, non-volatile organics. Pre-firing may be carried out using a suitable furnace, such as a continuous line furnace.

In an alternative embodiment, deposition of the particle mixture onto at least a portion of a substrate, may be achieved by the application of a tape comprising the particle mixture onto the portion of the at least one substrate. Such a tape may be prepared by tape casting.

In an alternative embodiment, deposition of the particle mixture onto at least a portion of a substrate, may be achieved using dry powder coating methods.

On firing of the deposited particle mixture, particles of the first and/or the second glass frit soften, flow and adhere to each of the substrates, thereby creating a bond or seal connecting the substrates. Advantageously, it has been found that the particle mixture of the present invention can achieve a hermetic seal, having high mechanical strength and chemical durability.

The particle mixture may be fired by heating the assembly of the first and second substrates with the particle mixture lying therebetween and in contact with both substrates, to a temperature sufficiently high to cause particles of the first and/or second glass frits to soften, flow and adhere to the substrate, and to burn off any remaining components deriving from the dispersion medium. For example, the firing may be carried out by heating the assembly to a temperature in the range 450 to 750° C., for example, 460 to 680° C. Heating the assembly may be carried out via convective heating, for example, using a suitable furnace, such as a continuous line furnace.

Alternatively, the particle mixture may be fired via radiative heating, for example, by irradiating the deposited particle mixture with an appropriate source of radiation. In one embodiment, at least one of the frits is capable of being heated by way of absorbing radiation. For example, where the particles of the first glass frit are dark in colour, they may absorb radiation which results in selective heating of the particles of the first glass frit, causing them to soften and flow. In a preferred embodiment, the first glass frit has a $T_f$ which is higher than that of the second glass frit. In this embodiment, heat generated as a result of the particles of first glass frit absorbing radiation will also heat the surrounding particles of the second glass frit, causing them to soften and flow. Thus, it may be sufficient that only one of the first and second glass frits is capable of being heated by absorption of radiation.

Where the particle mixture is fired by irradiating the deposited particle mixture with radiation, the source of radiation may be, for example, a laser or an infrared lamp. Ideally, the wavelength of the radiation is such that the radiation is easily transmitted through the substrates to be sealed. In this manner, the radiation may pass through the substrates without significant absorption, leaving the substrates relatively unheated, while at the same time the laser energy is absorbed by the first glass frit, thereby selectively heating the particle mixture to effect the firing thereof.

In some embodiments, firing of the particle mixture may be carried out using a combination of convective and radiative heating. In some embodiments, convective and radiative heating may be employed in parallel to effect firing of the particle mixture. In other embodiments, convective and radiative heating may be employed in sequence. For example, firing of the particle mixture may be effected by first heating the assembly via convective heating, followed by irradiating the deposited particle mixture with an appropriate source of radiation.

In the method of forming a seal or bond between two inorganic substrates of the present invention, each inorganic substrate may be a glass substrate, a ceramic substrate or a metal substrate. In a preferred embodiment, each substrate is a glass substrate, for example, a borosilicate glass substrate or a chemically tempered or thermally tempered soda lime glass substrate. The inorganic substrates may have a CTE in the range $10 \times 10^{-7}/°$ C. to $100 \times 10^{-7}/°$ C.

The kit, particle mixture and paste of the present invention may, for example, be employed in the formation of seals (e.g. hermetic seals) in the manufacture of articles which require encapsulation of sensitive components in an inert atmosphere (such as organic light emitting diode (OLED) displays, plasma display panels, semiconductor chips, sensors, solar cells, optical components or the like), or in articles which comprise an evacuated void (such as vacuum insulated glass (VIG) window units).

The present invention also provides article comprising at least two inorganic substrates being connected by a bond or a seal, wherein the bond or seal is obtained or obtainable by the method described above.

The present invention also provides the use of a kit, particle mixture or paste as described above to form a seal or bond between two substrates.

EXAMPLES

The invention will now be further described with reference to the following examples, which are illustrative, but not limiting of the invention.

Preparation of Glass Frit Particles

Glass frits were prepared using commercially available raw materials. The composition of each glass frit is given in Table 1 below. Each glass frit was prepared according to the following procedure.

Raw materials were mixed using a laboratory mixture. 100 g of the raw material mixture was melted in a corundum crucible using an electric kiln at a heating rate of 30K/minute and a dwell time at peak temperature of 30 minutes. The resulting molten glass was quenched in water to obtain glass frit. For frit (i) the peak temperature was 1200° C., for frit (ii) the peak temperature employed was 900° C.

The resulting frits were dry milled using a planetary mill at a speed of 300 rpm for 2 hours. Subsequently, the frits were sieved using a mesh 260 micron mesh.

TABLE 1

| Component | Molar % | | |
|---|---|---|---|
| | (i) | (ii) | (iii) |
| $B_2O_3$ | 21.89 | 33.0 | 21.86 |
| BaO | 15.54 | — | 1.23 |
| $Bi_2O_3$ | — | 46.2 | 46.18 |
| ZnO | 25.13 | 2.8 | 11.94 |
| $SiO_2$ | 21.20 | 8.0 | 7.76 |
| $Na_2O$ | 3.76 | — | — |
| $Al_2O_3$ | 3.41 | 5.0 | 3.12 |
| MnO | 3.30 | — | — |
| $Fe_2O_3$ | 1.38 | — | — |
| CuO | 1.16 | 5.0 | 3.64 |
| $Li_2O$ | 1.14 | — | 3.13 |
| $K_2O$ | 0.90 | — | 1.15 |
| CoO | 0.91 | — | — |
| $ZrO_2$ | 0.29 | — | — |

Preparation of Filler Particles

Cordierite filler particles were prepared by wet ball-milling cordierite, using water as the milling solvent.

Preparation of Glass Frit Powder Samples

Powder samples 1 to 6 (each a particle mixture according to the present invention) and comparative samples B and C were prepared via mixing the required components.

The composition of each powder sample is given in Table 2 below.

TABLE 2

| Component | Powder Sample | | | | | | | | | |
|---|---|---|---|---|---|---|---|---|---|---|
| (wt %) | A | 1 | 2 | 3 | 4 | B | C | D | 5 | 6 |
| Frit (i) | 100 | 75 | 50 | 25 | 20 | — | — | — | 25 | 50 |
| Frit (ii) | — | 25 | 50 | 70 | 80 | 90 | 95 | — | — | — |
| Filler | — | — | — | 5 | — | 10 | 5 | — | — | — |
| Frit (iii) | — | — | — | — | — | — | — | 100 | 75 | 50 |

Evaluation of Firing Range and Crystallisation Tendency

The powder samples prepared above were examined by hot stage microscopy (HSM) using a Misura 3 HSM microscope. The temperature was increased from room temperature to 1100° C. at a rate of 10° C. per minute, with a photograph of each sample being taken at each 1° C. increase.

Following the test method set out in DIN 51730, softening, sphering and hemi-sphering temperatures of each powder sample were determined from the HSM photographs.

FIG. 1 shows the softening temperature, sphering temperature and half-sphering temperature of the powder samples 1 to 4 and A to C samples determined from the microscopic studies, plotted as a function of frit (ii) content composition.

As can be seen from FIG. 1, increasing levels of frit (ii) has the effect of reducing softening, sphering and half-sphering temperatures compared with the powder sample comprising only frit (i).

As can also be seen from FIG. 1, the level of filler may impact the overall softening, sphering and half-sphering properties of the powder samples.

The glass transition temperature ($T_g$) and the crystallisation point (i.e. the temperature at which the onset of crystallisation occurs, "$T_c$") of powder samples A, D, 5 and 6 were measured by differential scanning calorimetry (DSC) at 10K/minute. The half-sphering temperature (HS) of each of powder samples A, D, 5 and 6 was measured by HSM according to the method described above. The difference between HS and $T_g$, and the difference between $T_c$ and HS for each of powder samples A, D, 5 and 6 was calculated. These results are shown in Table 3 below.

TABLE 3

| Powder Sample | $T_g$ (° C.) | HS (° C.) | $T_c$ (° C.) | Δ HS-$T_g$ (° C.) | Δ $T_c$-HS (° C.) |
|---|---|---|---|---|---|
| A | 510 | 687 | 700 | 177 | 13 |
| 5 | 385, 510* | 605 | 579 | 220 | −26 |
| 6 | 385, 510* | 644 | 693 | 259 | 49 |
| D | 385 | 602 | 578 | 217 | −24 |

*Powder samples 5 and 6 exhibited two glass transition temperatures, corresponding to those of the single frits.

The results shown in Table 3 demonstrate that the particle mixtures of the present invention may provide a wider operating window and reduced crystallisation temperatures compared to use of the individual glass frits.

Preparation of Pastes

Powder samples 1 to 4 and comparative powder samples A to C were mixed with a dispersion medium to form pastes. The dispersion medium comprised 85.5 wt % tri-decyl-alcohol, 9.5 wt % Elvacite 2046 and 5.0 wt % Nusperse FA 601.

Preparation of Sealed Glass Articles

Pastes comprising powder samples 1 to 4 and A to C as described above were employed to prepare Articles 1 to 4 and A to C respectively. Each article comprised two soda lime glass plates connected together by a seal. In each case, the paste was applied to both soda lime glass plates via screen printing such that a 60 micron wide coating of paste was applied 1 cm in from the edge of each plate. Each soda lime glass plates had a thickness of 2 mm. The applied paste coatings had a wet layer thickness of 50 microns. The applied paste coatings were dried at 150° C. for 10 minutes using a common chamber drying oven. resulting in a layer of deposited powder sample on each plate. The two glass plates were then assembled such that the layers of deposited powder sample lay sandwiched therebetween. In order to fire the deposited powder sample, the assembly was the heated in and oven at a heating rate of 5° C./minute up to a peak temperature in the range 430° C. to 600° C. The assembly was then held at peak temperature for 30 minutes and then cooled to room temperature at a cooling rate of 5° C. per minute to provide an article.

Evaluation of Seal Strength

Each of sealed glass articles 1 to 4 and A to D were subjected to wafer bond testing, whereby a razor blade was forced between the two glass plates. An article which experienced substrate breakage first while the seal was remained intact was evaluated as "Accepted". An article which experienced delamination of the seal prior to the breakage of the substrate was evaluated as "Rejected". The results of the seal strength testing are shown in Table 4 below.

TABLE 4

| Article | Seal strength |
|---|---|
| A | Accepted |
| 1 | Accepted |
| 2 | Accepted |
| 3 | Accepted |
| 4 | Accepted |
| B | Rejected |
| C | Accepted |

As can be seen from the results show in Table 4, with the exception of powder sample B which comprised 90 wt % frit (ii) and 10 wt % cordierite filler, all powder samples provided acceptable seal strength.

Evaluation of Hermeticity

Article 1 and articles A to C were subjected to "gross-leak" testing. Gross-leak testing was carried out according to the penetrant dye method set out in MIL-STD-883 TM 1014.13. Articles were immersed in a solution of Fluorescein dye (obtained from Acros Organics) and then placed in an autoclave chamber pressurized at 6 bar for 4 hours. The articles were then removed from the chamber, cleaned and dried and immediately examined using an ultraviolet light source. Where one or more illuminating dots were observed in the sealed area of an article, the article was rated as rejected, since this indicates that dye had penetrated the seal. Where illuminating dots were absent, the article was rated as accepted. The results of the gross leak testing are shown in Table 5 below.

TABLE 5

| Article | Gross-leak evaluation |
|---|---|
| A | Accepted |
| 1 | Accepted |
| B | Rejected |
| C | Accepted |

These results demonstrate that particle mixtures according to the present invention are capable of forming a hermetic seal. In particular, the results demonstrate that the particle mixture of the present invention (a dual frit system) can from a hermetic seal which is as good as or better than one formed using a single frit system.

Evaluation of Chemical Durability

Articles 1 to 4 and A to C prepared as described above were half immersed in 0.1N $H_2SO_4$ acid solution at 80° C. for 72 hours (the Toyota acid resistance test). The appearance of each article was then visually assessed. Articles showing both (i) no difference in colour between the acid-immersed area and the non-acid immersed area; and (ii) no delamination of the seal; were evaluated as "Accepted". Articles showing either (i) a difference in colour between the acid-immersed ad non-acid immersed area; or (ii) delamination of the seal; were evaluated as "Rejected". The results of the evaluation are shown in Table 6 below.

TABLE 6

| Article | Acid resistance |
|---|---|
| A | Accepted |
| 1 | Accepted |
| 2 | Accepted |
| 3 | Rejected (no colour difference but delamination observed) |
| 4 | Rejected (no colour difference but delamination observed) |
| B | Rejected (both colour difference and delamination observed) |
| C | Rejected (no colour difference but delamination observed) |

As can be seen from Table 6, articles 1 and 2 comprising seals prepared with a mixture of frit (i) and frit (ii) achieve satisfactory acid resistance t. Further, these results demonstrate that the relative quantities of frit (i) and (ii) and/or the quantity of filler present, may impact the acid resistance achieved.

As demonstrated by these Examples, the present invention may provide sealing compositions having wider sealing temperature operating windows and reduced crystallisation tendencies, without compromising, seal strength, hermeticity and chemical durability of the resulting seal.

The invention claimed is:

1. A particle mixture comprising particles of a first glass frit and particles of a second glass frit; wherein the first glass frit comprises
   ≥10 to ≤25 mol. % BaO; and
   ≥0 to ≤10 mol. % $Bi_2O_3$;
   and wherein the second glass frit comprises:
   ≥35 to ≤55 mol. % $Bi_2O_3$;
   ≥2 to ≤20 mol. % ZnO; and
   ≥10 to ≤40 mol. % $B_2O_3$.

2. The particle mixture as claimed in claim 1 wherein the first glass frit comprises:
   ≥10 to ≤25 mol. % BaO;
   ≥0 to ≤10 mol. % $Bi_2O_3$;
   ≥15 to ≤35 mol. % ZnO; and
   ≥15 to ≤35 mol. % $B_2O_3$.

3. The particle mixture as in claim 1 wherein the first glass frit further comprises ≥12 to ≤40 mol. % $SiO_2$.

4. The particle mixture as claimed in claim 1 wherein the first glass further comprises ≥1 to ≤20 mol. % transition metal oxide.

5. The particle mixture as claimed in claim 1 where the first glass frit further comprises ≥0.5 to ≤10 mol. % alkali metal oxide.

6. The particle mixture as claimed in claim 1 wherein the second glass frit further comprises ≥2 to ≤15 mol. % $SiO_2$.

7. The particle mixture as claimed in claim 1 wherein the second glass frit further comprises ≥0.5 to ≤10 mol. % alkali metal oxide.

8. The particle mixture as claimed in claim 1 wherein the $T_f$ of the second glass frit is lower than the $T_f$ of the first glass frit.

9. The particle mixture as claimed in claim 1 wherein the $T_f$ of the first glass frit is in the range 450 to 800° C.

10. The particle mixture as claimed in claim 1 wherein the $T_f$ of the second glass frit is in the range 250 to 700° C.

11. The particle mixture as claimed in claim 1 wherein both the first glass frit and the second glass frit are substantially free of PbO and substantially free of vanadium oxides.

12. The particle mixture as claimed in claim 1 wherein the D90 particle size of each of the first glass frit and the second glass frit is less than 35 microns.

13. The particle mixture as claimed in claim 1 comprising:
a) ≥25 to ≤75 wt. % particles of the first glass frit;
b) ≥25 to ≤75 wt. % particles of the second glass frit.

14. A particle mixture as claimed in claim 13 which further comprises:
c) ≥5 to ≤10 wt. % particles of filler.

15. The particle mixture as claimed in claim 14 wherein the D90 particle size of the particles of filler is less than or equal to the D90 particle size of one or both of the particles of first glass frit and the particles of second glass frit.

16. A paste comprising:
a) a particle mixture as claimed in claim 1; and
b) a dispersion medium.

17. A method of preparing a paste comprising mixing in any order:
a) particles of a first glass frit;
b) particles of a second glass frit; and
c) a dispersion medium;
wherein the first glass frit comprises ≥10 to ≤25 mol. % BaO and ≥0 to ≤10 mol. % $Bi_2O_3$; and the second glass frit comprises ≥35 to ≤55 mol. % $B_2O_3$, ≥2 to ≤20 mol. % ZnO and ≥10 to ≤40 mol. % boron oxide $B_2O_3$.

18. A method of forming a bond or seal between inorganic substrates, the method comprising:
i. providing a first inorganic substrate;
ii. providing a second inorganic substrate;
iii. depositing a particle mixture as claimed in claim 1 onto at least a portion of at least one of the inorganic substrates;
iv. assembling the first and second substrates such that the deposited particle mixture lies therebetween and in contact with both substrates;
v. firing the particle mixture.

19. The particle mixture as claimed in claim 1 wherein the D90 particle size of each of the first glass frit and the second glass frit is less than 30 microns.

20. The particle mixture as claimed in claim 1 wherein the D90 particle size of each of the first glass frit and the second glass frit is less than 25 microns.

21. The particle mixture as claimed in claim 1 wherein the D90 particle size of each of the first glass frit and the second glass frit is less than 20 microns.

22. The particle mixture as claimed in claim 1 wherein the D90 particle size of each of the first glass frit and the second glass frit is less than 15 microns.

23. The particle mixture as claimed in claim 1 wherein the D90 particle size of each of the first glass frit and the second glass frit is less than 10 microns.

24. The particle mixture as claimed in claim 1 wherein the D90 particle size of each of the first glass frit and the second glass frit is less than 5 microns.

25. The particle mixture as claimed in claim 1 wherein the D90 particle size of each of the first glass frit and the second glass frit is less than 2 microns.

26. The particle mixture as claimed in claim 9, wherein the $T_f$ of the first glass frit is in the range 500 to 700° C.

27. The particle mixture as claimed in claim 10, wherein the $T_f$ of the second glass frit is in the range 300 to 650° C.

* * * * *

UNITED STATES PATENT AND TRADEMARK OFFICE
CERTIFICATE OF CORRECTION

| | | |
|---|---|---|
| PATENT NO. | : 11,434,165 B2 | Page 1 of 1 |
| APPLICATION NO. | : 17/047301 | |
| DATED | : September 6, 2022 | |
| INVENTOR(S) | : Edwin Peter Kennedy Currie et al. | |

It is certified that error appears in the above-identified patent and that said Letters Patent is hereby corrected as shown below:

On the Title Page

Item (73), Under Column no. 1, in "Assignee", Line 1, Replace:
"Johnson Matthey Advances Glass Technologies B.V.,"
With:
--Johnson Matthey Advanced Glass Technologies B.V.,--

Signed and Sealed this
Fifth Day of August, 2025

Coke Morgan Stewart
*Acting Director of the United States Patent and Trademark Office*